United States Patent [19]
Bergmann

[11] Patent Number: 5,745,620
[45] Date of Patent: Apr. 28, 1998

[54] OPTICAL COUPLING

[75] Inventor: Ernest Eisenhardt Bergmann, Borough of Foutain Hill, Pa.

[73] Assignee: Lucent Technologies, Inc., Murray Hill, N.J.

[21] Appl. No.: 569,267

[22] Filed: Dec. 8, 1995

[51] Int. Cl.$^6$ .................................. G02B 6/00; G02B 6/36
[52] U.S. Cl. ............................................................. 385/56
[58] Field of Search ........................... 385/56, 76, 88–93, 385/139, 147

[56] References Cited

U.S. PATENT DOCUMENTS 5,104,242  4/1992  Ishikawa ................................ 385/73
5,140,663  8/1992  Edwards et al. ..................... 385/139
5,381,498  1/1995  Bylander ............................... 385/87
5,598,495  1/1997  Rittle et al. .......................... 385/75

*Primary Examiner*—Akm E. Ullah

[57]  ABSTRACT

An optical coupling prevents light from entering free space when disengaged. The optical coupling includes a receptacle and a connector plug. The receptacle has an opening and includes an optical radiation source, and a beam stop. The optical radiation engages the beam stop when the receptacle is disengaged from the connector plug. When the connector plug is engaged into the receptacle opening, optical radiation from the receptacle is emitted on the radiation receptor.

17 Claims, 2 Drawing Sheets

OPTICAL COUPLING

FIELD OF THE INVENTION

This invention relates to an optical coupling that does not allow optical radiation to enter free space when disengaged.

BACKGROUND OF THE INVENTION

Lasers, light emitting diodes, optical fibers, and other fiber optic components are standard in many communication applications using visible, ultraviolet, or infrared radiation. For example, some local area networks use fiber optic systems because they are inexpensive and can have many communication channels using multiplexing and other techniques.

The greater use of fiber optics, however, may increase the hazard of exposure to optical radiation. For example, if a fiber optic connector is disengaged, the radiation could exit this connector or exit from what it was previously connected, posing a safety hazard to the eyes of anyone that looks directly into the connector, or into what the connector was previously coupled.

Some prior art safety techniques for preventing inadvertent exposure to this optical radiation include various methods for checking when the connection is actually broken. For example, in some systems, when a connection is broken a receiver automatically determines that the signal is not arriving. It sends another signal through another channel and stops the transmission. One drawback to this system is the retransmission process. When someone engages the connectors again, it is difficult to determine when to retransmit. This demands much protocol between the transmitter and receiver. Other systems may send a weak signal which is not hazardous to the eyes. This weak signal received at the other end indicates that the connection must be present.

In another application, such as those having a bank of receptacles that are not always connected, this proposal would be inadequate. It would be desirable to have an optical coupling that overcomes such deficiencies. It would be desirable to have an alternate means of ensuring that no radiation is emitted when optical couplings are disengaged.

SUMMARY OF THE INVENTION

In accordance with the present invention, an optical coupling now prevents optical radiation from entering free space when disengaged. In accordance with the present invention, the optical coupling includes a receptacle having an opening. It also includes a beam stop and an optical radiation source mounted in the receptacle. A connector plug is adapted for engagement into the receptacle opening. The connector plug includes a radiation receptor for receiving radiation from the optical radiation source when the connector plug is engaged in the receptacle opening. Radiation from the radiation source engages the beam stop when the connector plug is disengaged from the receptacle.

In one aspect of the invention, the beam stop comprises a wall that encloses at least a portion of the opening. In another aspect of the present invention, the optical radiation source comprises an optical fiber having a fiber end mounted in the receptacle. Additionally, several optical fibers could be connected to the connector-coupling to form an array connector sharing an outer body and positioning means. Multiple fibers could be included in both the receptacle and the plug. The optical radiation source can also comprise a light emitting diode (LED) or laser. The radiation receptor can comprise an optical fiber end, a focusing element that transfers light to the fiber end, or a photodetector.

In still another aspect of the present invention, the connector plug includes a beam stop. Optical radiation emitted from the connector plug engages the connector plug beam stop to prevent optical radiation from the connector side from entering free space when the connector plug is disengaged from the receptacle.

In still another aspect of the present invention, the connector plug includes a chamber and an end wall closing off the chamber, forming the beam stop. A notched opening extends to the chamber and an optical fiber end extends into the chamber. Optical radiation is emitted from the optical fiber end. When engaged, the fiber end is deflected to have the emitted light redirected away from the end wall and toward an opening in the chamber.

In still another aspect of the present invention, the connectors are hermaphroditic connectors, and have a body member and an opening adapted for engaging another similar connector. An optical radiation source is mounted in the body member. The body member includes a reflecting surface spaced from the optical radiation source for reflecting optical radiation substantially toward the opening. A beam stop receives reflected optical radiation from the reflecting surface when the connector is disengaged to another connector so as to prevent optical radiation from entering free space. The hermaphroditic connector in accordance with the present invention includes means for locking two connectors together so that optical radiation reflected from one reflecting surface engages the other reflecting surface to form an optical radiation path from one connector to the other. The reflecting service can comprise a concave surface, and can include a surface finish for reflecting light.

DESCRIPTION OF THE DRAWINGS

The foregoing advantages and features of the present invention will be appreciated more fully from the following description, with references to the accompanying drawings.

DETAILED DESCRIPTION OF THE INVENTION

Figure 1:
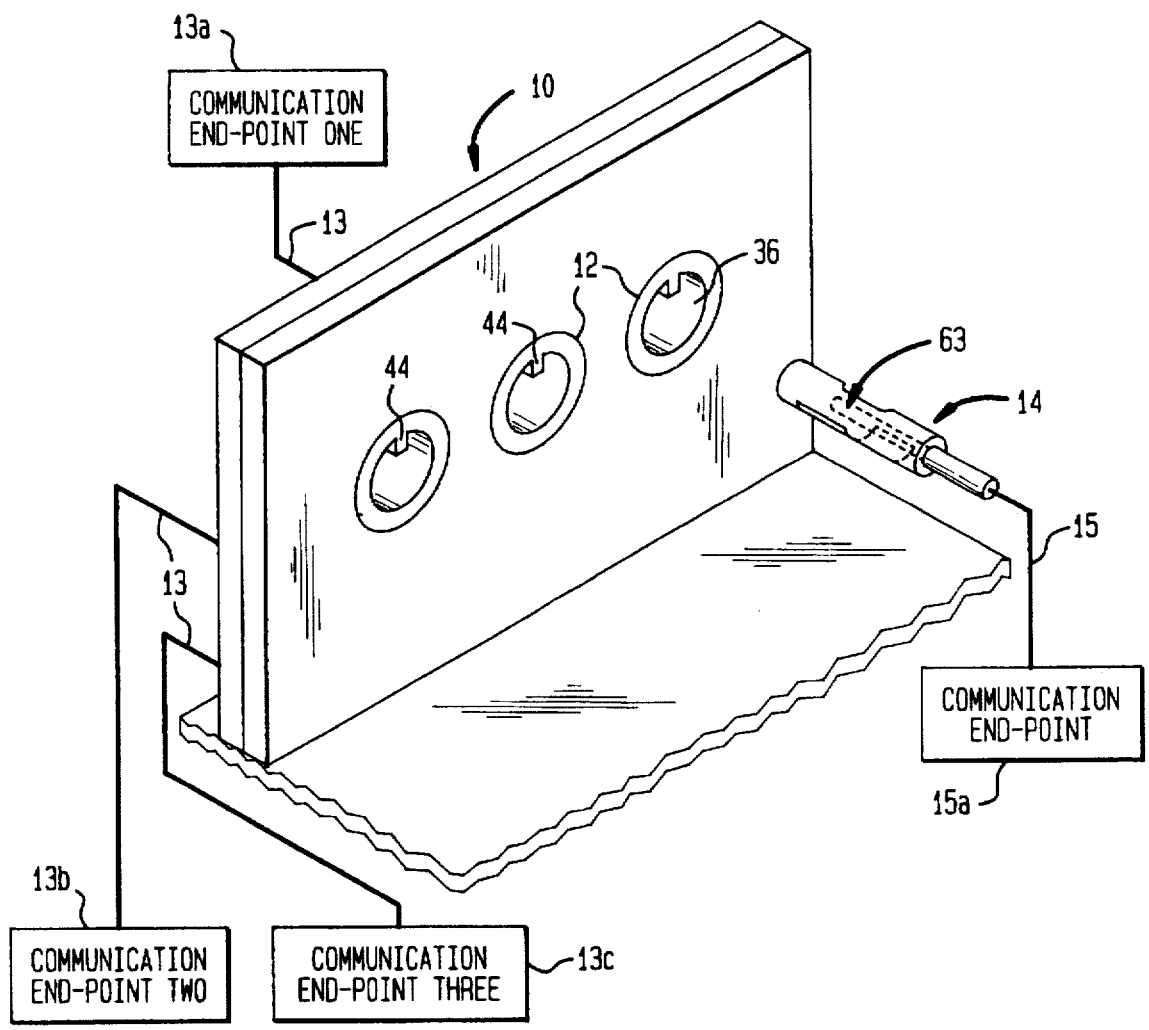
FIG. 1 is a schematic, partial isometric view showing a bank of receptacles and a connector plug adapted for receipt into one of the receptacles.

Referring now to FIG. 1, there is illustrated at 10 a bank of receptacles 12 that are adapted for receiving a connector plug 14 of the optical coupling, indicated at 16 (FIG. 2), of one aspect of the present invention and also prevent optical radiation from entering free space when the connector plug 14 and a receptacle 12 are disengaged from each other. This bank of receptacles 12 could be used in different applications, such as communications network or other type of local area network, e.g., a computer network having many different peripherals. In the illustrated embodiment of FIG. 1, three receptacles 12 are connected by optical fiber 13 to three communication endpoints 13a, 13b and 13c. The connector plug 14 is connected by optical fiber 15 to a communication endpoint 15a. The communication endpoints 13a, 13b and 13c could include a laser as a source of optical radiation. Typically, each receptacle includes an optical radiation source indicated generally at 18 in FIG. 2, such as an optical fiber end, laser or light emitting diode used in communication applications. The present invention is advantageous: when the connector plug 14 is not engaged to a receptacle 12, the optical radiation will not exit the receptacle, minimizing the potential hazard to any users that may look at the receptacle.

In the present invention, the optical radiation source 18 can emit visible light, infrared, or ultraviolet radiation. In the embodiment shown in FIGS. 1 and 2, the optical radiation source is an optical fiber 20 mounted within the receptacle 12 and having a fiber end 22 from which the optical radiation is emitted. The optical fiber 20 extends to a communication endpoint 24 that is part of a communication network. Additionally, the optical radiation source 18 can be a light emitting diode (LED), laser, or ball lens connected to a fiber end 22. Of course optical power is being passed into the fiber from some communications device.

Figure 2:
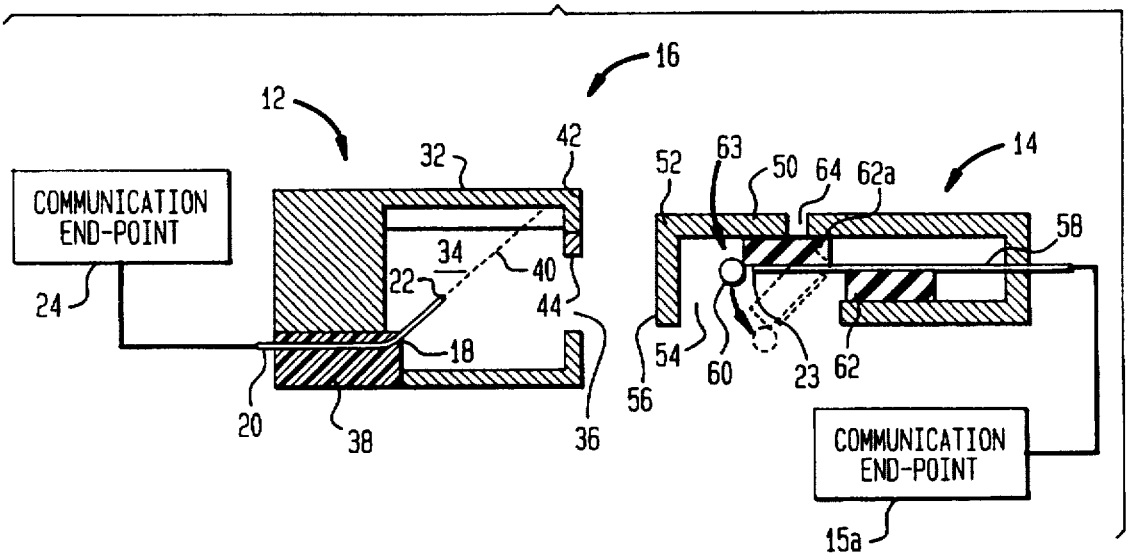
FIG. 2 is a partial sectional view of an optical coupling in accordance with the present invention showing a receptacle and connector plug.

As shown in FIG. 2, the receptacle 12 can be formed as a substantially cylindrically, or alternately, rectilinear configured member having walls 32 dimensioned to form an inner chamber 34 and an opening 36 that receives the connector plug 14. The receptacle 12 can be formed from a metallic, plastic or other similar material that can be readily formed into a desired configuration. The optical radiation source 18 is positioned inside the receptacle 12 on one side, on a support 38 and has a beam path 40 inclined upwardly toward the interior of the wall 32, and against the beam stop 42. The beam stop 42 is either part of the wall 32 or in one embodiment, a downwardly inclined flange member 42 connected to the front wall. Thus, the beam path 40 of the optical radiation is directed against the beam stop 42 and will not emit from the opening 36.

As shown in FIG. 2, the connector plug 14 includes a housing 50 that engages into the receptacle opening 36. The connector plug can also be cylindrically configured although it could be designed in various configurations depending on the design choice of those skilled in the art. The connector plug 14 includes a wall 52 forming a chamber 54 and a beam stop 56 at the end of the chamber 54. In the illustrated embodiment, an optical fiber 58 extends through the chamber 54 and includes a ball lens 60 or other focusing element connected to the fiber end 23, mounted on a support 62. The flexible support can be the fiber itself. There could also be a group of fibers. The support 62 need not be flexible. A pressure foot 62a is mounted on the optical fiber 58, and receives the flange member 44 to bend the optical fiber 58 downward as illustrated in FIG. 2, aligning the ball lens 60 with the beam path 40 when the parts are engaged.

The optical fiber 58 and ball lens 60 acts as a radiation receptor illustrated generally at 63, for receiving the optical radiation emitted by the optical radiation source 18. Examples of radiation receptors can include a fiber end; a lens, e.g., ball lens, leading to a fiber; and a photodetector. In this illustrated embodiment, when the connector plug 14 is inserted into the receptacle opening 36, the flange member 44 formed at the receptacle opening is inserted into a notch 64 of the connector member wall 52. There may be more than one "flange member" and more than one "notch" for added stability. The flange member 44 presses the optical fiber down so that the ball lens 60 connected to the optical fiber end 58 is in the direct beam path emitted from the optical radiation source 18. Additionally, as is well known to those skilled in the art, the radiation receptor could be an optical fiber end or a photodetector.

The receptacle and connector plug 14 also can be reversed so that the connector plug ball lens 60 acts as an optical radiation source. The receptacle optical fiber 20 in the receptacle 12 can act as radiation receptor. The different designs of the optical radiation sources and radiation receptors can vary depending on the design choices of those skilled in the art.

Figure 3:
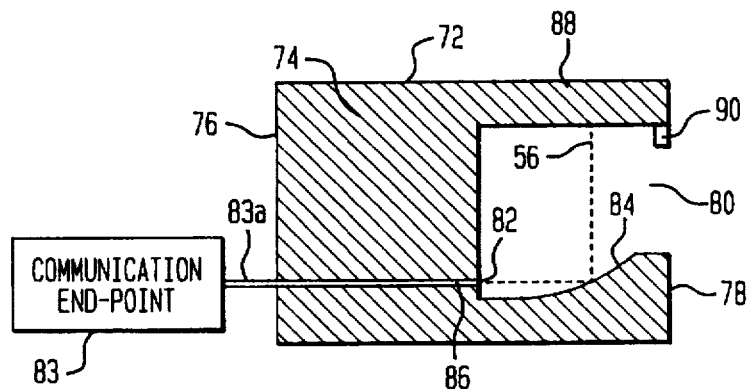
FIG. 3 is a partial schematic, sectional view showing a hermaphroditic connector.
Figure 4:
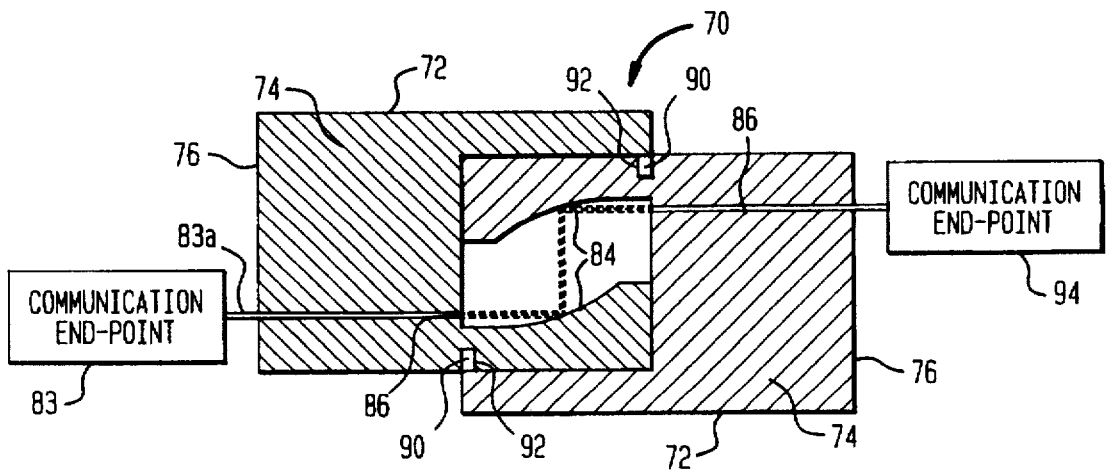
FIG. 4 is another partial sectional view showing the two hermaphroditic connectors connected together to form an optical coupling of the present invention.

Referring now to FIGS. 3 and 4, there is illustrated a hermaphroditic optical coupling 70 of another aspect of the present invention. As illustrated in FIG. 4, the coupling 70 consists of two connectors 72 that are neither male nor female but are interchangeable and substantially similar in configuration to each other. Each connector 72 includes a body member 74 that in one design could be substantially cylindrically, or alternately, rectilinear configured. The body member 74 could be formed from metal or plastic. Referring now to FIG. 3, the body member 74 has opposing ends 76, 78. One end 78 is adapted for mating with an opposing connector. That end 78 includes an opening 80 for receiving the other connector. An optical radiation source 82 is mounted in the body member and a reflecting surface 84, acting as a focusing mirror, is spaced from the optical radiation source 82.

As in the previous embodiment of FIGS. 1 and 2, the optical radiation source 82 could include a laser 83 that is mounted adjacent to the body member and connected to an optical fiber 83a. The laser could also be used without an intervening fiber. A light emitting diode (LED), ball lens connected to a fiber or other fiber end could be used. FIGS. 3 and 4 illustrate the use of a fiber end 86 as the optical radiation source 82. The fiber end 86 can also act as a radiation receptor, as well as the radiation source. Also a ball lens or other type of focusing lens could be connected to the fiber end. A photodetector could be connected adjacent the optical radiation source for receiving any radiation emitted from another connector. The reflecting surface 84 is spaced from the optical radiation source 82 and any radiation receptor that is included. The surface 84 reflects light substantially toward the opening 80. The body member 74 includes a ledge 88 acting as a beam stop 56 opposite the reflecting surface 84 for receiving the reflected optical radiation from the reflecting surface 84 when the connector 72 is not engaged to another connector to prevent the optical radiation from entering free space.

As shown in FIG. 4, when two hermaphroditic connectors 72 are engaged to each other, optical radiation that is reflected from one reflecting surface 84 engages the reflecting surface 84 in the connector to form an optical radiation path from one optical fiber end 86, to the other optical fiber end 86 of the second connector to a communication endpoint 94. The ledges 88 can also act to lock the members, and can include tabs 90 that are inserted within notches 92 on the body member of the opposing connector.

It should be understood that the foregoing description of the invention is intended merely to be illustrative thereof, and that other embodiments, modifications and equivalents may be apparent to those skilled in the art without departing from its spirit.

That which is claimed is:

1. An optical coupling comprising a receptacle having an opening;

a beam stop comprising a wall that encloses at least a portion of said opening;

an optical radiation source mounted in said receptacle; and a connector plug adapted for engagement into said receptacle opening, said connector plug including a radiation receptor for receiving optical radiation from said optical radiation source when said connector plug is engaged in said receptacle opening, radiation from said radiation source engaging said beam stop when said connector plug is disengaged from said receptacle.

2. The optical coupling according to claim 1 wherein said optical radiation source comprises a fiber end mounted in the receptacle.

3. The optical coupling according to claim 1 wherein said optical radiation source comprises a light emitting diode.

4. The optical coupling according to claim 1 wherein said optical radiation source comprises a laser.

5. The optical coupling according to claim 1 wherein said radiation receptor comprises an optical fiber end.

6. The optical coupling according to claim 1 wherein said radiation receptor comprises a lens and an optical fiber leading to the lens.

7. The optical coupling according to claim 1 wherein said radiation receptor comprises a photodetector.

8. The optical coupling according to claim 1 wherein said connector plug includes an optical radiation source.

9. The optical coupling according to claim 8 wherein said connector plug includes a plug beam stop, wherein radiation emitted from said optical radiation source in said connector plug engages said plug beam stop when the connector plug is disengaged with said receptacle.

10. An optical coupling comprising a receptacle having an opening;

a radiation receptor mounted within said receptacle;

a connector plug adapted for engagement into said receptacle opening, said connector plug including an optical radiation source an optical fiber end and a beam stop comprising a chamber and end wall closing off the chamber;

wherein optical radiation is emitted on said beam stop when said connector plug is disengaged from said receptacle, and emitted onto said radiation receptor in said receptacle when said connector plug is engaged to said receptacle.

11. The coupling according to claim 10 wherein said connector plug includes a notched opening within the connector plug and extending to the chamber, and an optical fiber extending into said chamber through which optical radiation is emitted.

12. The coupling according to claim 11 wherein said optical fiber is aligned to emit optical radiation onto said end wall forming said beam stop when said connector plug is disengaged from said receptacle, and is inclined toward the notched opening and aligned to said radiation receptor in the receptacle when said connector plug and receptacle are engaged.

13. An optical coupling comprising a first connector having a body member, an opening adapted for engaging a second connector, an optical radiation source mounted in the body member, and including a reflecting surface spaced from the optical radiation source for reflecting optical radiation substantially toward the opening, and a beam stop wherein said beam stop comprises a wall that encloses at least a portion of said opening, wherein optical radiation engages the beam stop when the connector is disengaged to a second connector, and a second connector having a body member, an opening adapted for engaging the first connector, an optical radiation receptor mounted in the body member, a reflecting surface spaced from the optical radiation receptor, wherein said first and second connectors are engaged together such that optical radiation reflected off the reflecting surface of the first connector engages the reflecting surface of the second connector and is reflected onto the optical radiation receptor.

14. An optical coupling comprising a receptacle having an opening;

a beam stop comprising a wall that encloses at least a portion of said opening;

a support mounted in said receptacle and adapted for supporting an optical radiation source; and a connector plug adapted for engagement into said receptacle opening, said connector plug including a support for mounting a radiation receptor to receive any optical radiation emitted from an optical radiation source when said connector plug is engaged in said receptacle opening, wherein radiation from a radiation source engages said beam stop when said connector plug is disengaged from said receptacle.

15. An optical coupling comprising a receptacle having an opening;

a support mounted within said receptacle for mounting a radiation receptor;

a connector plug adapted for engagement into said receptacle opening, said connector plug including a support for mounting an optical radiation source, and a beam stop wherein said beam stop comprises a wall that encloses at least a portion of said receptacle opening;

wherein optical radiation from an optical radiation source is emitted on said beam stop when said connector plug is disengaged from said receptacle, and emitted onto a radiation receptor in said receptacle when said connector plug is engaged to said receptacle.

16. An optical coupling comprising a receptacle having an opening;

a beam stop comprising a wall that encloses at least a portion of said opening;

a fiber mounted in said receptacle and adapted for carrying optical radiation; and a connector plug adapted for engagement into said receptacle opening, said connector plug including a radiation receptor to receive any optical radiation emitted from said fiber when said connector plug is engaged in said receptacle opening, wherein optical radiation from said fiber engages said beam stop when said connector plug is disengaged from said receptacle.

17. An optical coupling comprising a receptacle having an opening;

a radiation receptor mounted within said receptacle;

a connector plug adapted for engagement into said receptacle opening, said connector plug including a fiber adapted for carrying optical radiation, and a beam stop comprising a wall that encloses at least a portion of said opening;

wherein optical radiation from said fiber is emitted on said beam stop when said connector plug is disengaged from said receptacle, and emitted onto said radiation receptor in said receptacle when said connector plug is engaged to said receptacle.

* * * * *